(12) United States Patent
Doi

(10) Patent No.: US 10,255,530 B2
(45) Date of Patent: Apr. 9, 2019

(54) PRINTING APPARATUS AND METHOD FOR CALIBRATING INPUT VOLTAGE IN PRINTING APPARATUS

(71) Applicant: SEIKO EPSON CORPORATION, Tokyo (JP)

(72) Inventor: Takashi Doi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/877,653

(22) Filed: Jan. 23, 2018

(65) Prior Publication Data
US 2018/0225555 A1 Aug. 9, 2018

(30) Foreign Application Priority Data

Feb. 3, 2017 (JP) ................................ 2017-018633

(51) Int. Cl.
G06K 15/02 (2006.01)
G06K 15/10 (2006.01)
H04N 1/00 (2006.01)
B41J 29/393 (2006.01)

(52) U.S. Cl.
CPC .......... *G06K 15/027* (2013.01); *B41J 29/393* (2013.01); *G06K 15/102* (2013.01); *H04N 1/00037* (2013.01); *H04N 1/00058* (2013.01); *H04N 2201/0005* (2013.01); *H04N 2201/0082* (2013.01)

(58) Field of Classification Search
CPC ............... G06K 15/027; G06K 15/102; H04N 1/00058; H04N 1/00037; H04N 2201/0005; H04N 2201/0082; B41J 29/393
See application file for complete search history.

(56) References Cited

U.S. PATENT DOCUMENTS

2010/0020176 A1* 1/2010 Higashibara .............. B60R 1/00
348/148

FOREIGN PATENT DOCUMENTS

JP 2004-284064 A 10/2004

OTHER PUBLICATIONS

IP.com search (Year: 2018).*

* cited by examiner

Primary Examiner — Lisa Solomon

(57) ABSTRACT

A printing apparatus includes a print chip that has a first nozzle group with a common input voltage; a print controller that controls to print a test image containing a first test region and a second test region which are printed upon input of a first voltage and a second voltage, respectively, the second voltage being different from the first voltage; an image capturing unit that image-captures a plurality of regions formed by dividing the test image; a density detector that detects densities of a first detection target region and a second detection target region in captured images; and a voltage calibrator that calibrates the input voltage based on the densities of the first detection target region and the second detection target region and values of the first voltage and the second voltage, wherein positions of the first detection target region and the second detection target region are identical.

8 Claims, 10 Drawing Sheets

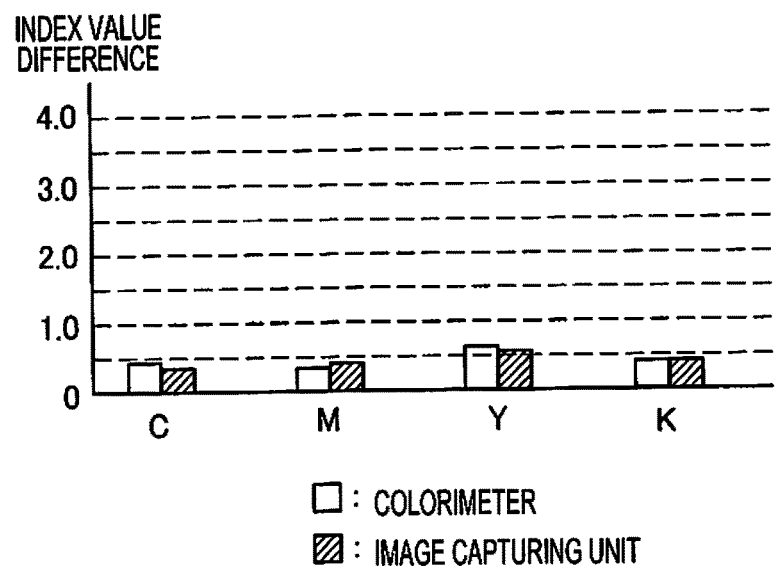
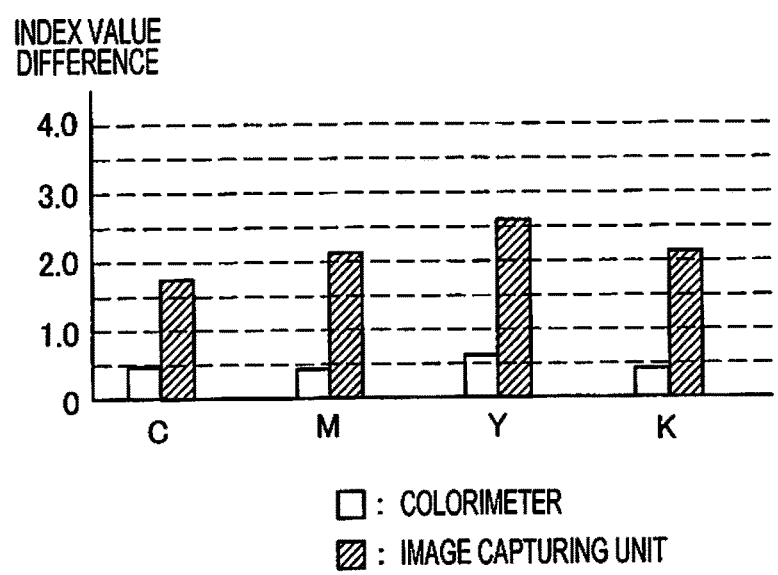

PRINTING APPARATUS AND METHOD FOR CALIBRATING INPUT VOLTAGE IN PRINTING APPARATUS

BACKGROUND

1. Technical Field

The present invention relates to calibration of an input voltage for discharging ink in a printing apparatus.

2. Related Art

In recent years, ink jet printers in which print chips formed by chipping ink discharge mechanisms such as piezoelectric elements, ink chambers, and nozzles by applying a semiconductor processing technique are mounted have been used as printing apparatuses. Such printing apparatuses have a risk that regardless of the same model, the same amount of ink is not discharged when the same voltage is input as a voltage (hereinafter, referred to as an "input voltage") for driving the piezoelectric elements due to individual differences of the print chips, and desired densities cannot be provided in print results. In order to cope with this risk, a method for providing a desired density by performing test printing and calibrating the input voltage in the printing apparatus has been proposed. For example, in JP-A-2004-284064, a reference voltage and voltages obtained by adding and subtracting a predetermined differential voltage to and from the reference voltage are respectively input for printing test images (patches), ink densities in the respective printed test images are measured, and a voltage capable of achieving a predetermined density (for example, density of 50% or the like) is provided based on a relation between the respective provided densities and the respective voltages.

Even with the method disclosed in JP-A-2004-284064, the configuration in which an image capturing device such as a camera captures the test images and the ink densities are measured causes a risk that input voltage calibration accuracy is lowered due to differences in environments in image capturing of regions as ink density measurement targets. For example, in the configuration in which image capturing and density measurement are performed multiple times in order to reduce measurement errors and so on, for example, if positions of the measurement regions as the ink density measurement targets in the test images differ every density measurement, the following risk arises. That is, the input voltage calibration accuracy is lowered due to differences in environments such as a positional relation between the measurement region and lighting and a positional relation between the measurement region and a lens included in the image capturing device. For this reason, a technique capable of calibrating the input voltage to the printing apparatus with high accuracy has been desired.

SUMMARY

An advantage of some aspects of the invention is to solve at least the above-described issues and can be implemented in the following aspects.

1. According to an aspect of the invention, a printing apparatus that performs printing on a medium is provided. The printing apparatus includes a print chip that has a first nozzle group through which ink is discharged in accordance with a commonly used input voltage; a print controller that controls the print chip to print, on the medium, a test image containing a first test region which is printed upon input of a first voltage as the input voltage and a second test region which is printed upon input of a second voltage as the input voltage, the second voltage being different from the first voltage; an image capturing unit that image-captures each of a plurality of regions having a region containing the first test region and a region containing the second test region, which are formed by dividing the test image printed on the medium; a density detector that detects a density of a first detection target region as at least a part of the first test region in a captured image provided by image capturing by the image capturing unit and a density of a second detection target region as at least a part of the second test region in the captured image; and a voltage calibrator that calibrates the input voltage based on the density of the first detection target region, the density of the second detection target region, a value of the first voltage, and a value of the second voltage, wherein a position of the first detection target region in the captured image and a position of the second detection target region in the captured image are matched each other.

With the printing apparatus in this aspect, the position of the first detection target region in the captured image and the position of the second detection target region in the captured image are matched each other. Therefore, a difference between an environment in image capturing of the region containing the first detection target region and an environment in image capturing of the region containing the second detection target region can be reduced, thereby suppressing lowering of input voltage calibration accuracy.

2. In the printing apparatus in the above aspect, the first detection target region and the second detection target region may have the same shape and size. With the printing apparatus in this aspect, the first detection target region and the second detection target region have the same shape and size. Therefore, the density of the first detection target region and the density of the second detection target region can be detected under similar conditions, thereby suppressing lowering of the input voltage calibration accuracy.

3. In the printing apparatus in the above aspect, the first detection target region may not contain outer edges of the first test region, and the second detection target region may not contain outer edges of the second test region. With the printing apparatus in this aspect, the first detection target region does not contain the outer edges of the first test region and the second detection target region does not contain the outer edges of the second test region. Normally, printing is not performed on an outer portion relative to the outer edges of the first test region. Therefore, an influence by light entering the first detection target region from a portion of white as a color of paper itself and an influence by light entering the second detection target region from an outer portion (normally, a portion of white) relative to the outer edges of the second test region can be suppressed. Accordingly, the density of the first detection target region and the density of the second detection target region can be measured accurately.

4. In the printing apparatus in the above aspect, the image capturing unit may image-capture each of the regions such that a position of the first test region in the captured image and a position of the second test region in the captured image are matched each other. With the printing apparatus in this aspect, the image capturing unit image-captures each of the regions such that the position of the first test region in the captured image and the position of the second test region in the captured image are matched each other. Therefore, the position of the first detection target region in the first test region and the position of the second detection target region in the second test region can be matched each other. Accordingly, detection conditions of the density of the first detection target region and detection conditions of the density of the second detection target region can be further matched each other, thereby suppressing lowering of the input voltage calibration accuracy.

5. In the printing apparatus in the above aspect, the print chip may further have a second nozzle group which is different from the first nozzle group, and through which ink of the same color as a color of the ink that is discharged through the first nozzle group is discharged in accordance with a common second input voltage being different from the input voltage; the print controller may control the print chip to print, as the test image, an image containing, in addition to the first test region and the second test region, a third test region which is printed upon input of a third voltage as the second input voltage and a fourth test region which is printed upon input of a fourth voltage as the second input voltage, the fourth voltage being different from the third voltage; the image capturing unit may image-capture a region containing the first test region and the third test region by one time and a region containing the second test region and the fourth test region by one time; the density detector may detect a density of a third detection target region as at least a part of the third test region in the captured image and a density of a fourth detection target region as at least a part of the fourth test region in the captured image; the voltage calibrator may calibrate the second input voltage based on the density of the third detection target region, the density of the fourth detection target region, a value of the third voltage, and a value of the fourth voltage; and a position of the third detection target region in the captured image and a position of the fourth detection target region in the captured image may be matched each other.

With the printing apparatus in this aspect, in the configuration in which the print chip has the first nozzle group and the second nozzle group receiving input of voltages different from each other, the input voltages (the input voltage and the second input voltage) to the nozzle groups can be respectively calibrated with high accuracy. In addition, the region containing the first test region and the third test region is image-captured by one time and the region containing the second test region and the fourth test region is image-captured by one time. Therefore, time required to calibrate the input voltage and the second input voltage and processing load can be reduced in comparison with the configuration in which a region containing the first test region and a region containing the third test region are separately image-captured and the configuration in which a region containing the second test region and a region containing the fourth test region are separately image-captured.

6. In the printing apparatus in the above aspect, the print chip may have a third nozzle group which is different from the first nozzle group, through which ink of a different color from a color of the ink that is discharged through the first nozzle group is discharged, and to which the same voltage as the input voltage is commonly input when executing printing with the same print density as the first nozzle group; a dark ink may be discharged through the first nozzle group; a light ink may be discharged through the third nozzle group; and the voltage calibrator may calibrate the input voltage to calibrate the voltage which is input to the third nozzle group and is the same voltage as the input voltage together. With the printing apparatus in this aspect, the voltage (the same voltage as the input voltage) that is input to the third nozzle group for discharging the light ink is calibrated together with calibration of the voltage that is input to the first nozzle group for discharging the dark ink. Therefore, lowering of calibration accuracy of the voltage that is input to the third nozzle group can be suppressed in comparison with the configuration in which the voltage that is input to the third nozzle group is calibrated separately from the voltage that is input to the first nozzle group. As a reason of this, in general, the degree of change in the density in response to change in the input voltage is larger for the dark ink than the light ink, and an influence of density measurement errors can therefore be further suppressed.

7. In the printing apparatus in the above aspect, the voltage calibrator may derive a correspondence relation between the input voltage and a density based on the density of the first detection target region, the density of the second detection target region, the value of the first voltage, and the value of the second voltage, and set a value of the input voltage, which corresponds to a previously set target density in the correspondence relation, as the input voltage. With the printing apparatus in this aspect, the correspondence relation between the input voltage and the density is derived based on the density of the first detection target region, the density of the second detection target region, the value of the first voltage, and the value of the second voltage, and the value of the input voltage, which corresponds to the previously set target density in the correspondence relation, is set as the input voltage. Therefore, the input voltage can be accurately set so as to provide the target density.

The invention can also be implemented in various forms. For example, the invention can be implemented in forms of a method for calibrating an input voltage in a printing apparatus, a method for manufacturing the printing apparatus, a computer program for implementing these methods, and a recording medium recording therein the computer program.

BRIEF DESCRIPTION OF THE DRAWINGS

The invention will be described with reference to the accompanying drawings, wherein like numbers reference like elements.

FIG. 9 is a descriptive view for explaining variations in densities for respective ink colors when the densities at the same positions in different captured images or different color measurement regions are detected.

FIG. 10 is a descriptive view for explaining variations in the densities for the respective ink colors when the densities at different positions in the same captured image or the same color measurement region are detected.

DESCRIPTION OF EXEMPLARY EMBODIMENTS

A. Embodiment

A1. Apparatus Configuration

Figure 1:
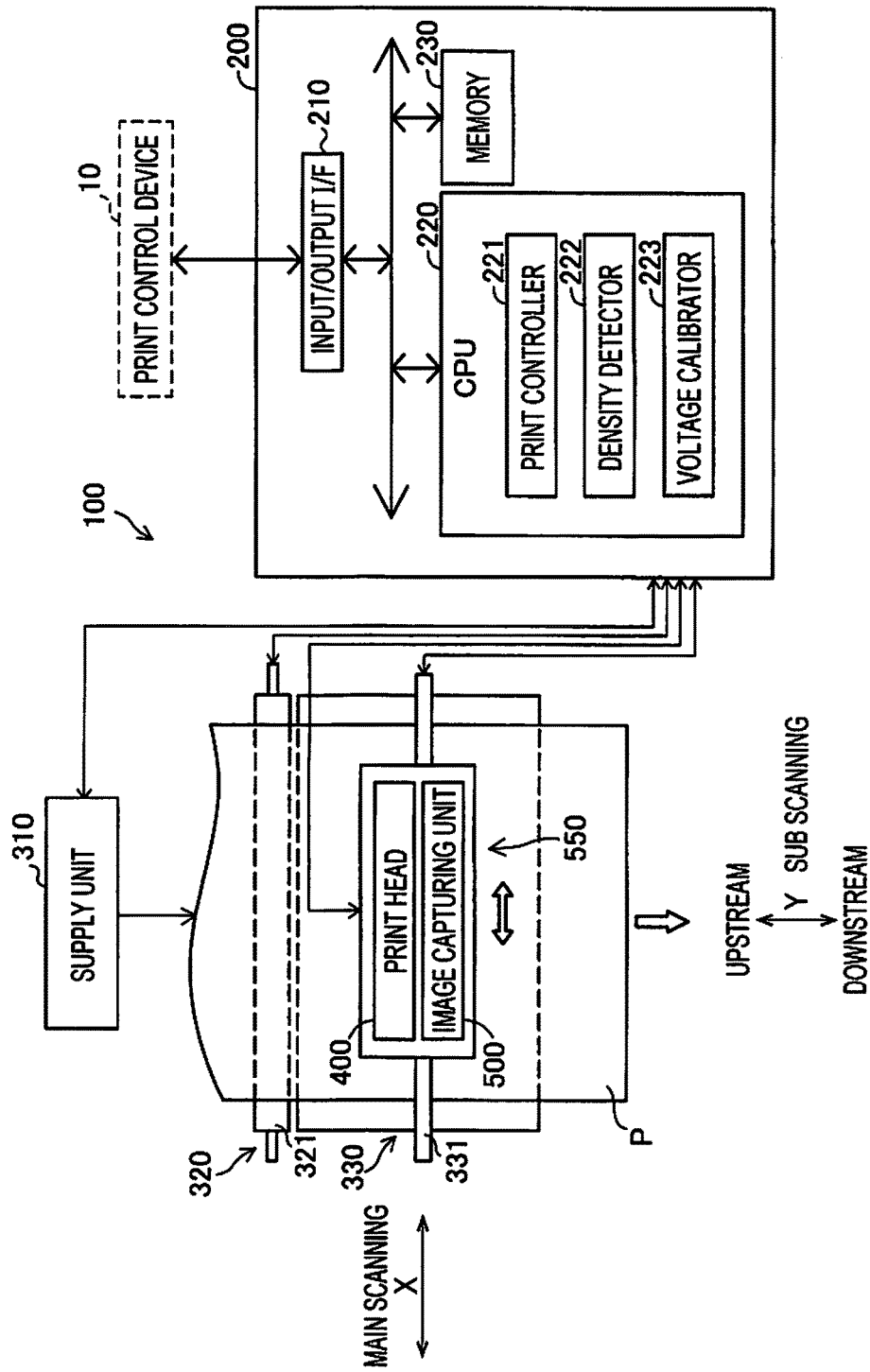
FIG. 1 is a block diagram illustrating the schematic configuration of a printing apparatus as an embodiment of the invention.

FIG. 1 is a block diagram illustrating the schematic configuration of a printing apparatus 100 as an embodiment of the invention. The printing apparatus 100 is a so-called ink jet printer. The printing apparatus 100 discharges ink through a plurality of nozzles onto a medium P based on print data input from a print control device 10 and thereby forms dots on the medium P to print images, characters, and the like. In the embodiment, the printing apparatus 100 discharges inks of four colors, that is, inks of C (cyan), M (magenta), Y (yellow), and K (black). In the embodiment, the medium P is print paper. It should be noted that the medium P is not limited to the print paper and a desired medium on which images and the like can be formed with ink dots may be employed.

The printing apparatus 100 includes a controller 200, a supply unit 310, a medium transportation unit 320, a carriage transportation unit 330, a carriage 550, an image capturing unit 500, and a print head 400.

The controller 200 controls the printing apparatus 100 overall. The controller 200 is configured by a microcomputer and includes a CPU (central processing unit) 220, a memory 230, and an input/output I/F (interface) 210. All of the CPU 220, the memory 230, and the input/output interface 210 are connected to an internal bus and they are configured to be communicable with one another.

The CPU 220 functions as a print controller 221, a density detector 222, and a voltage calibrator 223 by executing a control program that is previously stored in the memory 230. The print controller 221 collectively controls printing based on the print data input from the print control device 10. To be specific, the print controller 221 generates a signal (hereinafter, referred to as an "input signal") for driving the print head 400 based on the print data and transmits the signal to the print head 400. The print controller 221 controls the supply unit 310 to control supply of the medium P. The print controller 221 controls the medium transportation unit 320 to transport the medium P. In the embodiment, a transportation direction of the medium P is referred to as a sub scanning direction Y. The print controller 221 controls the carriage transportation unit 330 to cause the carriage 550 to reciprocate. In the embodiment, a movement direction of the carriage 550 is the direction orthogonal to the sub scanning direction Y and is referred to as a main scanning direction X.

In input voltage calibration processing, which will be described later, the density detector 222 measures a density of a predetermined region in a test image printed in one process of the processing. The input voltage calibration processing is processing of calibrating a magnitude of the above-described input signal (hereinafter, referred to as an "input voltage"). With this processing, the input voltage is calibrated such that a density in a print result is an expected density. In the embodiment, the "density" means brightness. In the embodiment, the "brightness" is expressed as L* in an L*a*b* color space but is not limited to be expressed as L* in the L*a*b* color space and may be expressed as brightness in a desired color space such as L* in an L*u*v* color space. It should be noted that the test image will be described in detail while illustrating the print result in the drawing in the input voltage calibration processing, which will be described later.

The voltage calibrator 223 calibrates the input voltage in the input voltage calibration processing, which will be described later. More specific processing contents of the density detector 222 and the voltage calibrator 223 will be described in the input voltage calibration processing, which will be described later.

The input/output interface 210 includes, in the printing apparatus 100, various interface groups for connection with external apparatuses. The external apparatuses are the above-described print control device 10, a digital still camera (not illustrated), a smart phone (not illustrated), and the like. The various interface groups are interface groups for making communication using, for example, a USB (universal serial bus), Bluetooth (registered trademark), various wired LANs defined in IEEE802.3, and various wireless LANs defined in IEEE802.11.

The print control device 10 is described simply here. The print control device 10 transmits the print data to the printing apparatus 100 to cause the printing apparatus 100 to execute printing, and acquires and displays information indicating a state of the printing apparatus 100. In the embodiment, the print control device 10 is configured by a personal computer in which driver software for the printing apparatus 100 is installed. The print control device 10 generates the print data and transmits the print data to the printing apparatus 100. The print data is generated in a similar manner to general print data generation procedures in printing apparatuses. To be specific, first, image data formed by gradation values of respective colors of R (red), G (green), and B (blue) is converted (subject to color conversion) into image data formed by gradation values of respective ink colors (C, M, Y, and K). Then, the image data after the color conversion undergoes halftone processing and is converted into gradation values (2-bit data) of four stages, which can be expressed by the printing apparatus 100. The four stages indicate individual uses of two types of dots (L dots and S dots) having different sizes, combination use thereof, and non-use. Thereafter, rasterization processing is performed on the image data after the halftone processing. A print control command is added to the data after the rasterization processing, so that the print data is generated.

The supply unit 310 includes a paper tray and supplies the medium P accommodated in the paper tray in the direction toward a place at which the carriage 550 is arranged. It should be noted that the supply unit 310 may include a roll body around which the medium P is wound, a roll driving motor, and a roll driving wheel train instead of the paper tray.

The medium transportation unit 320 includes a transportation roller 321. The medium transportation unit 320 rotationally drives the transportation roller 321 in accordance with a control signal from the CPU 220 (to be more specific, the print controller 221) to move the medium P supplied from the supply unit 310 relatively to the carriage transportation unit 330. Although not illustrated in the drawing, the medium transportation unit 320 is provided with sensors such as a feed detection sensor for detecting a transportation amount of the medium P and a front end detection sensor for detecting a front end position of the medium P. The print controller 221 controls the medium transportation unit 320 by referring to signals from these sensors.

The carriage transportation unit 330 causes the carriage 550 to reciprocate along the main scanning direction X in accordance with a control signal from the CPU 220 (to be more specific, the print controller 221). The carriage transportation unit 330 includes a carriage guide shaft 331 and a carriage motor (not illustrated). The carriage guide shaft 331 is arranged along the main scanning direction X and both end portions thereof are fixed to a housing of the printing apparatus 100.

The carriage 550 is mounted on the carriage guide shaft 331 so as to reciprocate in the main scanning direction X. When the carriage transportation unit 330 drives the carriage motor in accordance with the control signal from the print controller 221, the carriage 550 reciprocates along the carriage guide shaft 331. Although not illustrated in the drawing, the carriage transportation unit 330 includes a carriage position sensor for detecting a position of the carriage 550. The print controller 221 controls a movement amount of the carriage 550 by referring to a signal from the carriage position sensor. The carriage 550 reciprocates in the main scanning direction X as described above together with discharge of the inks from the print head 400 and the medium P is transported, so that an image or the like is printed on the medium P.

The image capturing unit 500 captures the image printed on the medium P, that is, a dot group formed on the medium P. The image capturing unit 500 is arranged on a surface of the carriage 550, which faces the medium P. The image capturing unit 500 captures the image when the carriage 550 moves in the main scanning direction X. The length of an image capturing range of the image capturing unit 500 along the main scanning direction X is shorter than the length of the medium P in the main scanning direction X. Accordingly, the image capturing unit 500 can image-capture the overall region of the medium P in the main scanning direction X by continuously performing image capturing while moving in the main scanning direction X together with the carriage 550. In the embodiment, the image capturing unit 500 is configured by an area sensor. It should be noted that the image capturing unit 500 may be configured by a line sensor instead of the area sensor.

The print head 400 is configured by four print heads each of which includes two print chips having a plurality of nozzles for discharging the inks of the respective colors (C, M, Y, K). The print head 400 is mounted on the carriage 550 and reciprocates in the main scanning direction X on the medium P with the reciprocation operation of the carriage 550.

Figure 2:
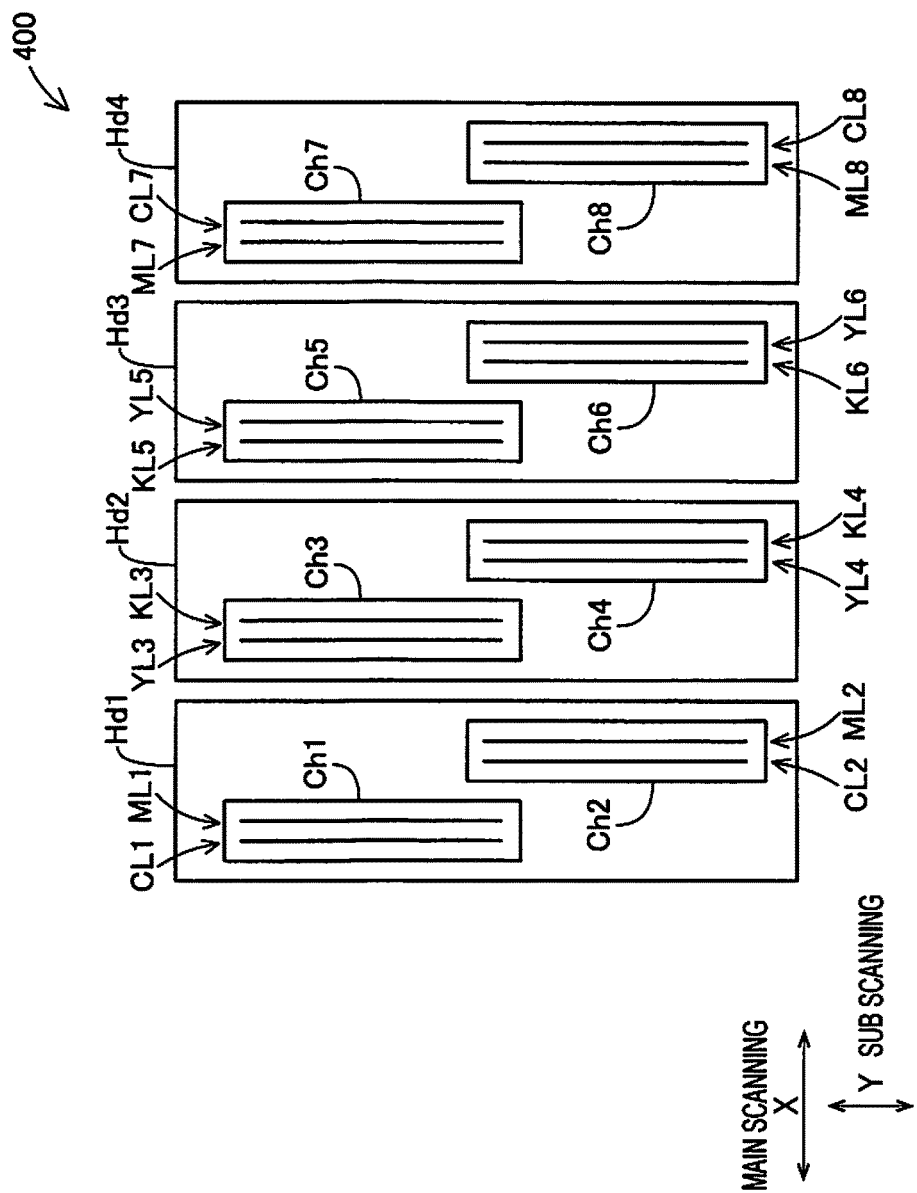
FIG. 2 is a descriptive view for explaining the detailed configuration of a print head.

FIG. 2 is a descriptive view for explaining the detailed configuration of the print head 400. FIG. 2 illustrates the configuration of the print head 400 when viewed in the direction toward the carriage 550 from the medium P. The print head 400 includes a first print head Hd1, a second print head Hd2, a third print head Hd3, and a fourth print head Hd4. Each of the print heads Hd1 to Hd4 includes two print chips. The two print chips included in the respective print heads Hd1 to Hd4 are arranged at similar positions in the respective print heads Hd1 to Hd4 in a similar manner. To be specific, the two print chips are arranged so as to be aligned in the main scanning direction X such that regions thereof are partially overlapped in the sub scanning direction Y. The first print head Hd1 includes a first print chip Ch1 and a second print chip Ch2. The second print head Hd2 includes a third print chip Ch3 and a fourth print chip Ch4. The third print head Hd3 includes a fifth print chip Ch5 and a sixth print chip Ch6. The fourth print head Hd4 includes a seventh print chip Ch7 and an eighth print chip Ch8. The respective print chips Ch1 to Ch8 are print chips formed by chipping ink discharge mechanisms such as piezoelectric elements, ink chambers, and nozzles by applying a semiconductor processing technique.

The first print chip Ch1 includes two nozzle groups (nozzle rows) for discharging the inks of different ink colors. To be specific, the first print chip Ch1 includes a first nozzle group CL1 for discharging the C (cyan) ink and a second nozzle group ML1 for discharging the M (magenta) ink. Similarly, the second print chip Ch2 includes a third nozzle group CL2 for discharging the C (cyan) ink and a fourth nozzle group ML2 for discharging the M (magenta) ink. As described above, the two print chips Ch1 and Ch2 include the two nozzle groups for discharging the inks of the same color combination.

Similarly, the third print chip Ch3 includes a fifth nozzle group YL3 for discharging the Y (yellow) ink and a sixth nozzle group KL3 for discharging the K (black) ink. The fourth print chip Ch4 includes a seventh nozzle group YL4 for discharging the Y (yellow) ink and an eighth nozzle group KL4 for discharging the K (black) ink.

The fifth print chip Ch5 includes a ninth nozzle group KL5 for discharging the K (black) ink and a tenth nozzle group YL5 for discharging the Y (yellow) ink. The sixth print chip Ch6 includes an eleventh nozzle group KL6 for discharging the K (black) ink and a twelfth nozzle group YL6 for discharging the Y (yellow) ink.

The seventh print chip Ch7 includes a thirteenth nozzle group ML7 for discharging the M (magenta) ink and a fourteenth nozzle group CL7 for discharging the C (cyan) ink. The eighth print chip Ch8 includes a fifteenth nozzle group ML8 for discharging the M (magenta) ink and a sixteenth nozzle group CL8 for discharging the C (cyan) ink.

The respective print chips Ch1 to Ch8 receive input signals supplied from the CPU 220 (to be more specific, the print controller 221) and discharge the inks through the respective nozzle groups in accordance with the input voltages. In the printing apparatus 100, the two types of dots (L dots and S dots) having sizes different from each other are ejected in a distinguished manner by changing types of the input signals (input voltages). The input signal for each dot size is used commonly by the two nozzle groups arranged in the same print chip. For example, one type of input signal (input voltage) as a signal for forming the L dots is supplied to the first print chip Ch1 and is commonly used by the first nozzle group CL1 and the second nozzle group ML1. Furthermore, one type of input signal (input voltage) as a signal for forming the S dots is input to the first print chip Ch1 and is commonly used by the first nozzle group CL1 and the second nozzle group ML1. By contrast, different input signals (input voltages) as input signals for forming the dots having the same size can be supplied to the nozzle groups arranged in different print chips. For example, an input signal for forming the L dots, which is supplied to the first nozzle group CL1 of the first print chip Ch1, and an input signal for forming the L dots, which is supplied to the third nozzle group CL2 of the second print chip Ch2, are different from each other in some cases. Initial values (initial voltage values) of the input signals that are used in the respective print chips are previously stored in the memory 230. The initial values are set before shipping of the printing apparatus 100 as voltage values common to printing apparatuses of the same model as that of the printing apparatus 100. However, there is a risk that even when the input signals of the initial values are supplied, the amounts of the inks that are discharged vary and dots having desired sizes cannot be provided due to individual differences of the print chips. To cope with this risk, the printing apparatus 100 executes the input voltage calibration processing, which will be described later, to reduce fluctuations of the input signals (input voltages) due to the individual differences and provide desired ink densities. Furthermore, the input voltage calibration processing, which will be described later, enables the calibration to be executed accurately.

A2. Input Voltage Calibration Processing

Figure 3:
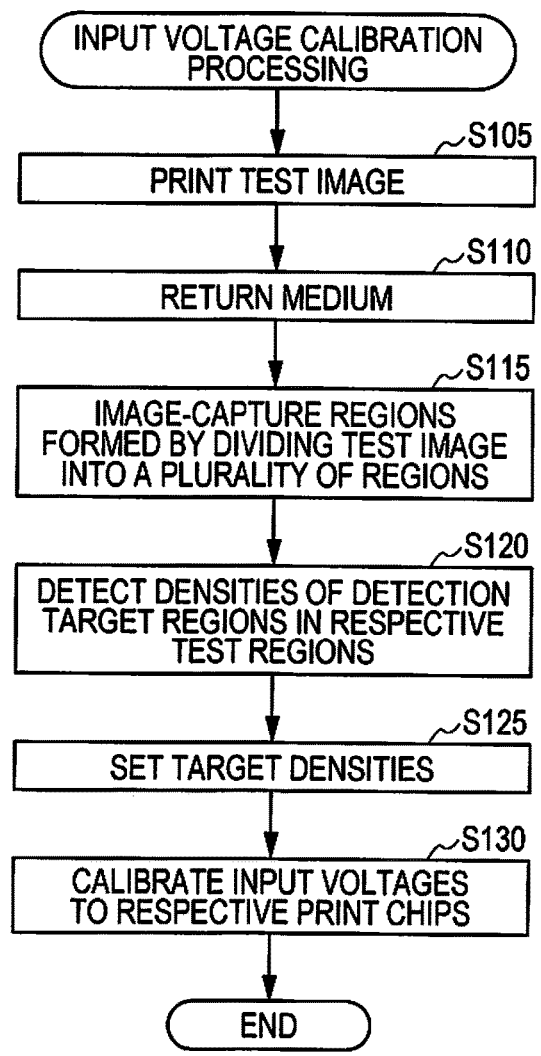
FIG. 3 is a flowchart illustrating procedures of input voltage calibration processing.

FIG. 3 is a flowchart illustrating procedures of the input voltage calibration processing. When a user selects a menu of the input voltage calibration processing from a menu screen in the print control device 10 and instructs to execute the input voltage calibration processing, the print control device 10 transmits image data of a test image to the printing apparatus 100. When the printing apparatus 100 receives the test image data, it executes the input voltage calibration processing.

The print controller 221 controls to print the test image on the medium P based on the input image data of the test image (step S105). In this case, the S dots and the L dots are formed using the input signals (input voltages) stored in the memory 230.

Figure 4:
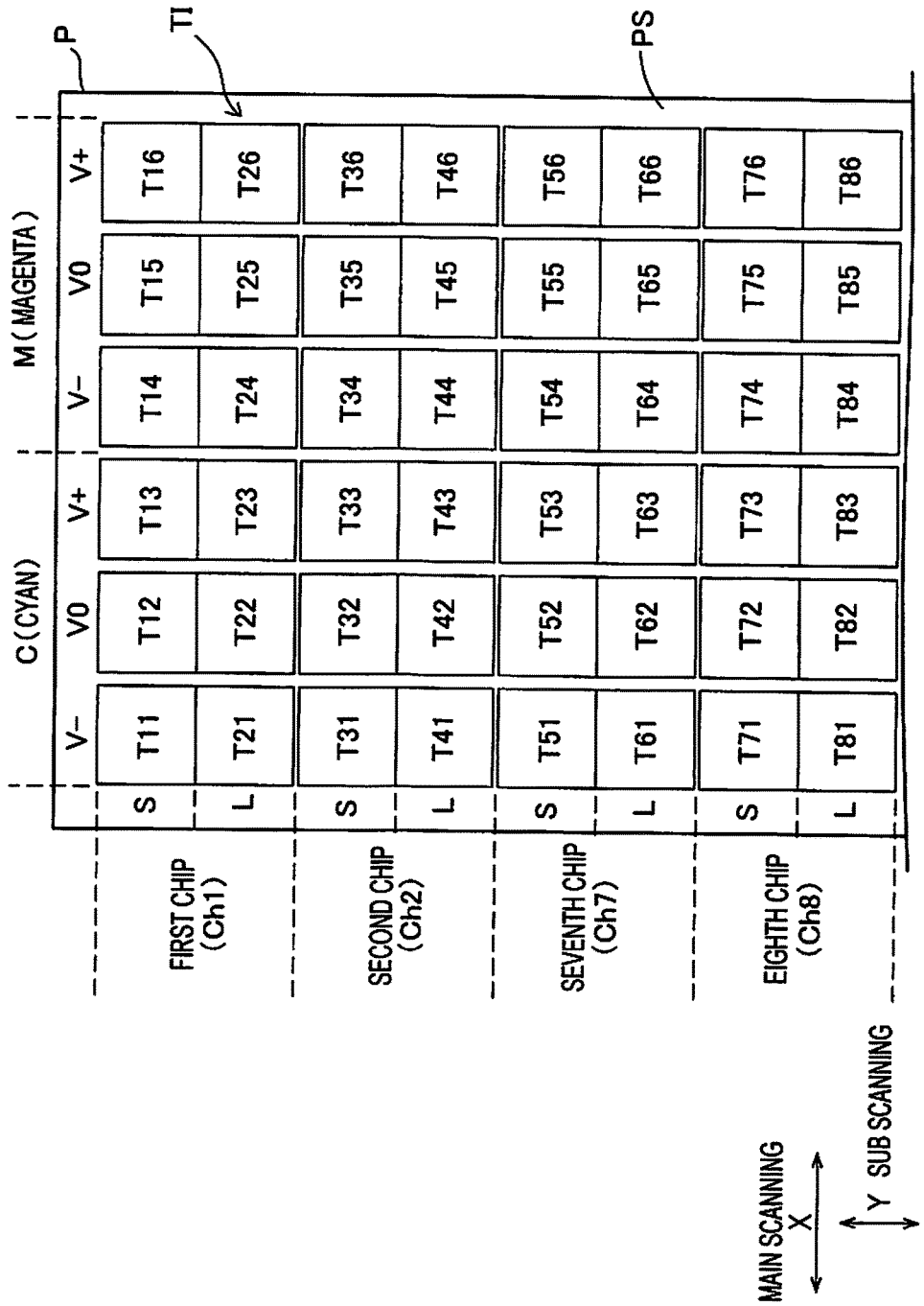
FIG. 4 is a descriptive view for explanation, which illustrates a part of a test image printed on a medium.

FIG. 4 is a descriptive view for explanation, which illustrates a part of a test image TI printed on the medium P. FIG. 4 illustrates only a part of the test image TI along the sub scanning direction Y. The test image TI is formed by an aggregate of a large number of rectangular regions (hereinafter, referred to as "test regions") having the same size. FIG. 4 illustrates 48 test regions T11 to T16, T21 to T26, T31 to T36, T41 to T46, T51 to T56, T61 to T66, T71 to T76, and T81 to T86. Each of the test regions is formed by a plurality of dots. In the embodiment, each test region is printed by forming the plurality of dots such that an ink duty is 50%. The ink duty indicates a recording ratio (print density) of the dots per unit area on the medium P. The respective test regions are different from one another in at least one element of the print chip that has discharged the ink, the dot size, the ink color (nozzle group), and an input voltage difference. The above-described element "input voltage difference" indicates a voltage difference from a reference voltage, which will be described later.

To be specific, for example, the three test regions T11 to T13 are different from one another in the input voltage difference and are the same as one another in the other elements of the print chip (first print chip Ch1) that has discharged the ink, the dot size (S size), and the ink color (cyan). The test region T11 is formed by inputting, to the first print chip Ch1 (first nozzle group CL1), a voltage V− which is lower than a reference voltage V0 for forming the S dots by a predetermined voltage. The test region T12 is formed by inputting, to the first print chip Ch1 (first nozzle group CL1), the reference voltage V0 for forming the S dots. The test region T13 is formed by inputting, to the first print chip Ch1 (first nozzle group CL1), a voltage V+ which is higher than the reference voltage V0 for forming the S dots by a predetermined voltage.

For example, the test region T11 and the test region T21 are different from each other in the dot size and are the same as each other in the other elements (the print chip that has discharged the ink, the ink color (nozzle group), and the input voltage difference). To be specific, the test region T11 is formed by the S dots and the test region T21 is formed by the L dots. They can be achieved by supplying a signal for forming the S dots to the upper-half nozzle group of the first nozzle group CL1 illustrated in FIG. 2 and supplying a signal for forming the L dots to the lower-half nozzle group thereof. The test region T11 is formed by inputting, to the first print chip Ch1 (first nozzle group CL1), the voltage V− which is lower than the reference voltage V0 for forming the S dots by the predetermined voltage, as described above. Similarly, the test region T21 is formed by inputting, to the first print chip Ch1 (first nozzle group CL1), a voltage V− which is lower than a reference voltage V0 for forming the L dots by a predetermined voltage.

For example, the test region T11 and the test region T14 are different from each other in the ink color (the nozzle group for discharging the ink) and are the same as each other in the other elements (the print chip that has discharged the ink, the dot size, and the input voltage difference). For example, the test region T11 and the test region T31 are different from each other in the print chip that has discharged the ink and are the same as each other in the other elements (the dot size, the ink color (nozzle group), and the input voltage difference).

In the embodiment, the test regions T11 to T26 that are formed by the first print chip Ch1 and the test regions T31 to T46 that are formed by the second print chip Ch2 are formed by forward movement of the reciprocation operation in the main scanning direction X. On the other hand, the test regions T51 to T66 that are formed by the seventh print chip Ch7 and the test regions T71 to T86 that are formed by the eighth print chip Ch8 are formed by backward movement in the main scanning direction X. Although not illustrated in the drawing, the test regions with the K (black) ink and the test regions with the Y (yellow) ink are formed to be continuous to the respective test regions illustrated in FIG. 4.

By referring to FIG. 3 again, the print controller 221 controls the medium transportation unit 320 to return the medium P on which the test image has been printed to the upstream side from the downstream side (step S110). The print controller 221 controls the medium transportation unit 320 to transport again the medium P on which the test image has been printed to the downstream side from the upstream side, controls the carriage transportation unit 330 to cause the carriage 550 to reciprocate, controls the image capturing unit 500 to image-capture each of a plurality of regions formed by dividing the test image printed on the medium P, and stores the obtained captured images in the memory 230 (step S115).

Figure 5:
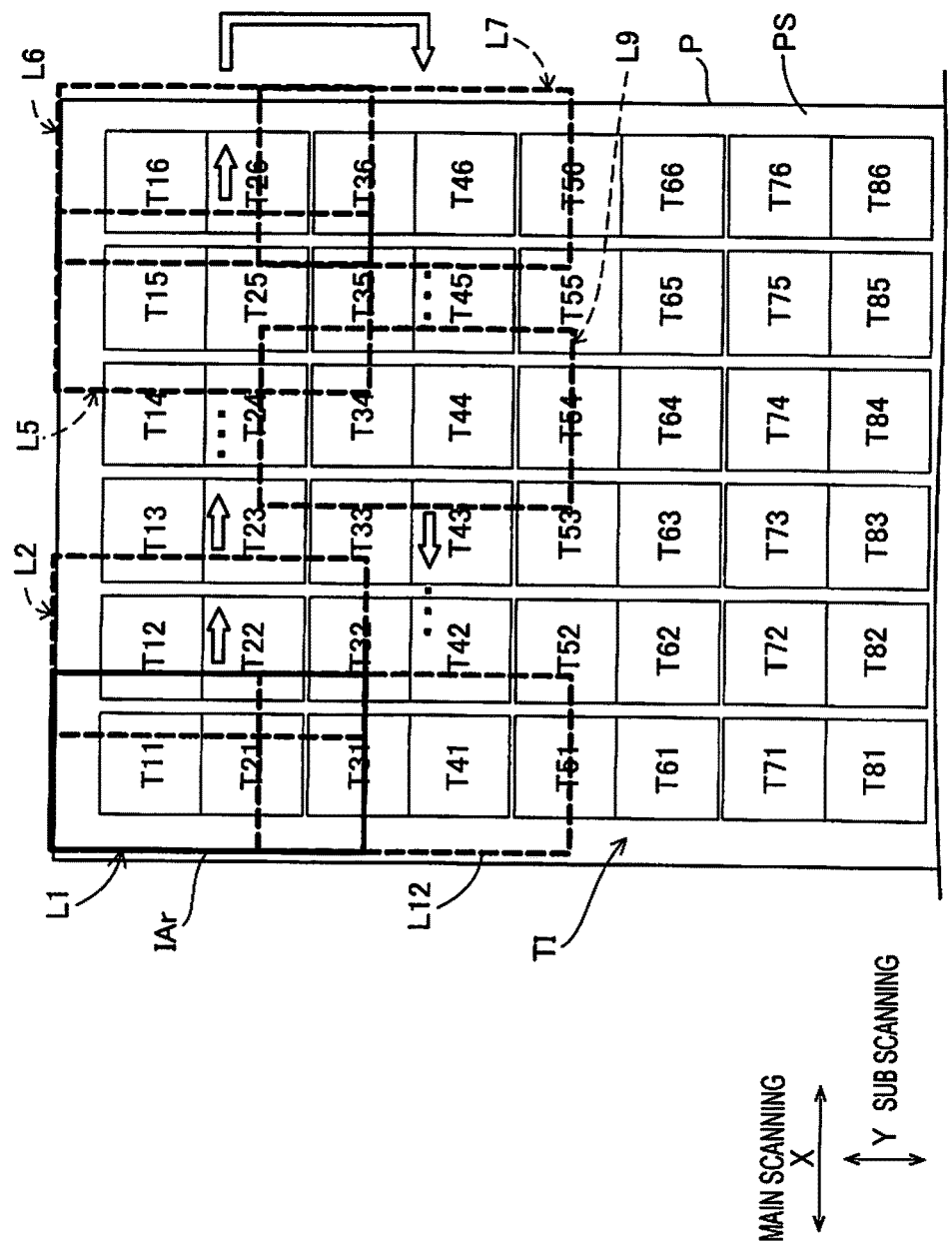
FIG. 5 is a descriptive view for explanation, which schematically illustrates change in a position of an image capturing region.

FIG. 5 is a descriptive view for explanation, which schematically illustrates change in a position of an image capturing region IAr at step S115. The image capturing region IAr of the image capturing unit 500 has an oblong shape elongated in the sub scanning direction Y. The image capturing region has such size that it covers whole two test regions aligned in the sub scanning direction Y and parts of the test regions aligned with these two test regions at the right, left, up, and down sides. The position of the image capturing region IAr is changed in accordance with movement of the image capturing unit 500 in the main scanning direction X and movement of the medium P in the sub scanning direction Y. FIG. 5 illustrates positions L1, L2, L5, L6, L7, L9, and L12 with dashed lines as examples of the position of the image capturing region IAr.

At step S115, first, image capturing is performed at the position L1 covering, at the center of the image capturing region IAr, the test region T11 and the test region T21. Thereafter, the image capturing region is moved to the right side along the main scanning direction X with the forward operation of the carriage 550 and subsequent image capturing is performed at the position L2 covering, at the center of the image capturing region IAr, the test region T12 and the test region T22 which are respectively located at the next right side of the test region T11 and the test region T21. In this manner, the image capturing is performed at each position at which the image capturing region IAr covers, at the center, two test regions located at the next right side while the image capturing region is moved to the right side along the main scanning direction X. FIG. 5 also illustrates the position L5 during the movement. Then, after the image capturing is performed at the position L6 covering, at the center, the test region T16 and the test region T26 located at the right end in the test image TI, the medium P is transported. Subsequently, the image capturing is performed at the position L7 deviated from the position L6 in the sub scanning direction Y. The position L7 is a position covering, at the center, the test region T36 and the test region T46. Thereafter, the image capturing region is moved to the left side from the position L7 along the main scanning direction X with the backward operation of the carriage 550. FIG. 5 also illustrates the position L9 during the movement. After the image capturing is performed at the position L12 covering, at the center, the test region T31 and the test region T41 located at the left end in the test image TI, the medium P is transported. The image capturing is thus performed every movement for one test region during the movement to the right end from the left end. After the image capturing is performed at the right end, the image capturing region is moved for two test regions in the sub scanning direction Y and the image capturing is performed every movement for one test region during the movement to the left end from the right end. These operations are repeated to capture the whole test image TI while the test image TI is divided into the plurality of regions.

In the embodiment, the image capturing is performed such that the positions of the two test regions covered at the centers in the image capturing regions are the same as one another in the image capturing at the respective positions. Accordingly, the positions of the test regions in the obtained captured images are substantially the same. In the embodiment, the "position of the test region" indicates a position of a gravity center of the test region. It should be noted that a desired position representative of the test region may be alternatively used as the position of the test region.

By referring to FIG. 3 again, the density detector 222 detects the densities of detection target regions in the respective test regions (step S120). The detection target regions are regions as targets when the densities are detected, and correspond to a part of the test regions in the embodiment.

Figure 6:
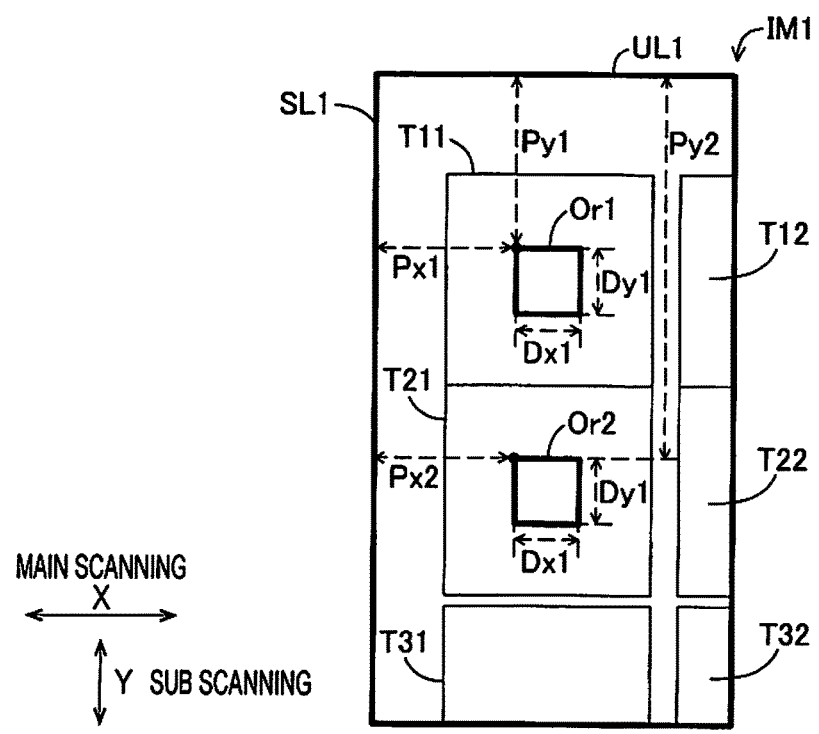
FIG. 6 is a descriptive view for explanation, which illustrates an example of detection target regions.
Figure 7:
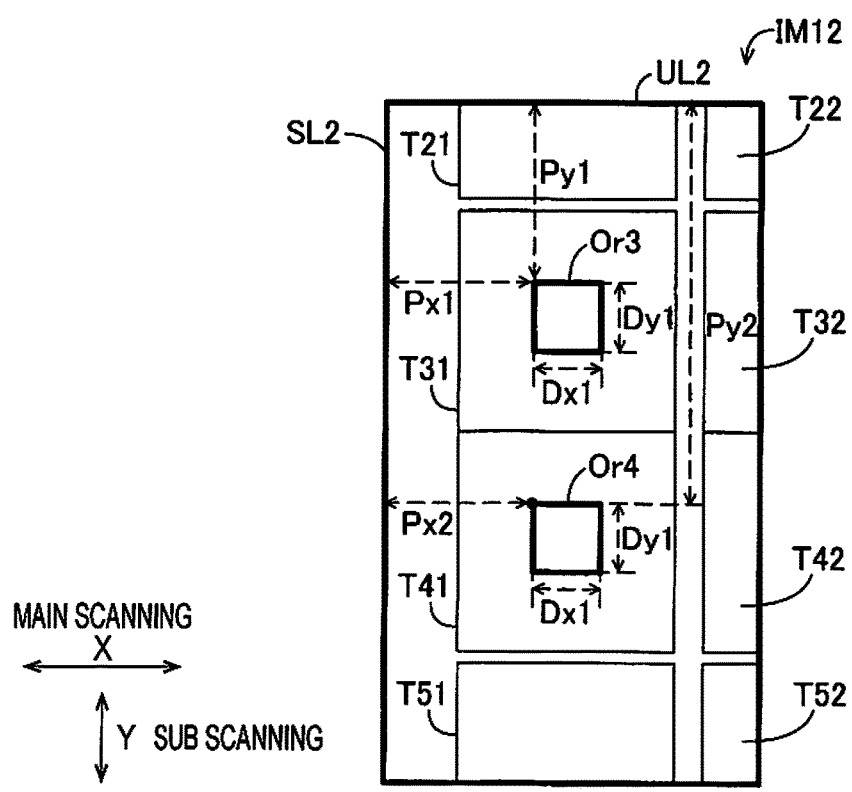
FIG. 7 is a descriptive view for explanation, which illustrates another example of the detection target regions.

FIG. 6 and FIG. 7 are descriptive views for explanation, which illustrate examples of the detection target regions. FIG. 6 and FIG. 7 illustrate the detection target regions in captured images different from each other. To be specific, FIG. 6 illustrates two detection target regions Or1 and Or2 in a captured image IM1 obtained by the image capturing at the position L1. FIG. 7 illustrates two detection target regions Or3 and Or4 in a captured image IM12 obtained by the image capturing at the position L12.

As illustrated in FIG. 6 and FIG. 7, one detection target region is set to each test region. In the embodiment, shapes and sizes of the respective detection target regions are equal to one another. To be specific, the respective detection target regions Or1 to Or4 illustrated in FIG. 6 and FIG. 7 are rectangular regions formed by sides which are parallel with the main scanning direction X and sides which are parallel with the side scanning direction Y. The respective detection target regions are located at substantially centers of the respective test regions and do not contain the outer edges of the respective test regions. The detection target regions can be made farther from blank portions on which no test region is printed. This can reduce an influence on the densities by light reflected by the blank portions and entering the detection target regions because the detection target regions are located at substantially centers of the test regions and do not contain the outer edges of the test regions as described above. Lengths Dy1 of the sides of the respective detection target regions Or1 to Or4, which are parallel with the side scanning direction Y, are equal to one another. Furthermore, lengths Dxl of the sides of the respective detection target regions Or1 to Or4, which are parallel with the main scanning direction X, are equal to one another.

Positions (positions in the respective captured images) of the two test regions contained in the respective captured images are equal to each other. For example, the position of the detection target region Or1 contained in the captured image IM1 in the captured image IM1 and the position of the detection target region Or3 contained in the captured image IM12 in the captured image IM12 are equal to each other. To be specific, a distance Py1 between the upper left corner of the detection target region Or1 and an upper side UL1 of the captured image IM1 and a distance Py1 between the upper left corner of the detection target region Or3 and an upper side UL2 of the captured image IM12 are equal to each other. Furthermore, a distance Px1 between the upper left corner of the detection target region Or2 and a left side SL1 of the captured image IM1 and a distance Px1 between the upper left corner of the detection target region Or3 and a left side SL2 of the captured image IM12 are equal to each other.

At step S120, the density detector 222 measures densities at a plurality of points in the respective detection target regions and detects average values of the measured densities as the densities of the corresponding detection target regions.

As illustrated in FIG. 3, the voltage calibrator 223 sets target densities based on the densities detected at step S120 and the input voltages supplied to the respective print chips Ch1 to Ch8 when the test image is printed (step S125). The voltage calibrator 223 calibrates the input voltages, to be more specific, the input voltages for the respective dot sizes to the respective print chips Ch1 to Ch8 using the target densities set at step S125 (step S130).

Figure 8:
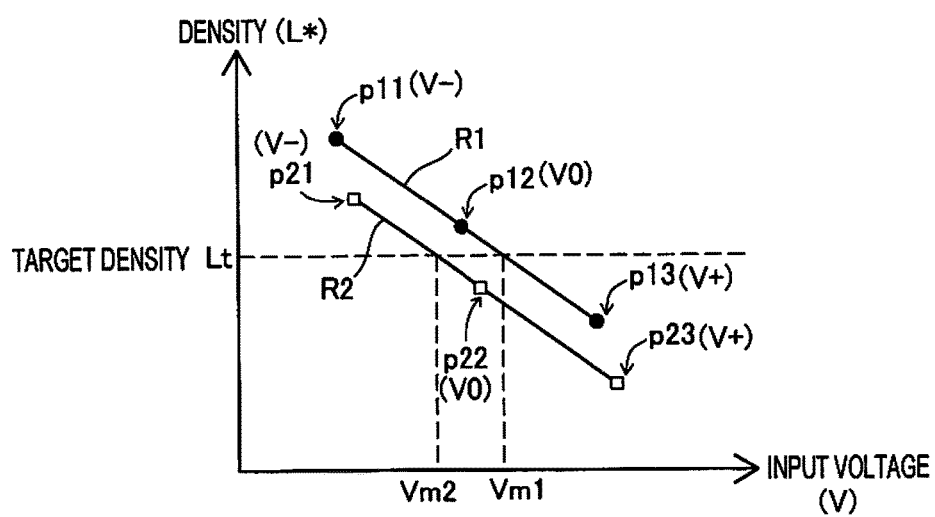
FIG. 8 is a descriptive view for explaining methods for setting a target density and calibrating an input voltage.

FIG. 8 is a descriptive view for explaining methods for setting the target density and calibrating the input voltage. A transverse axis in FIG. 8 indicates the input voltage (V) and a longitudinal axis in FIG. 8 indicates the detected density (L*). A detection point p11 indicates a density detected in the detection target region (detection target region Or1 in FIG. 6) contained in the test region T11. A detection point p12 indicates a density detected in the detection target region (not illustrated) contained in the test region T12. A detection point p13 indicates a density detected in the detection target region (not illustrated) contained in the test region T13. A detection point p21 indicates a density detected in the detection target region (detection target region Or3 in FIG. 7) contained in the test region T31. A detection point p22 indicates a density detected in the detection target region contained in the test region T32. A detection point p23 indicates a density detected in the detection target region contained in the test region T33. Reference symbols V0, V+, and V− as voltage values of the input signals in printing of the detection target regions in which the respective detection points are detected are added to the vicinities of the respective detection points p11 to p23.

As illustrated in FIG. 8, even when the dot sizes, the ink colors (nozzle groups), and the input voltage differences are the same, different densities are detected if the print chips that have discharged the inks are different. For example, the detection point p12 and the detection point p22 are common in the dot size as the S dots, are common in the ink color as cyan, and are common in the input voltage difference as the reference voltage V0 (voltage difference of 0). The density at the detection point p12 is however higher than the density at the detection point p22. Such a difference in the brightness therebetween is generated because the relations between the input voltage and the amount of the ink that is discharged are different from each other due to the individual differences of the respective print chips.

The target density is set for each ink color and each dot size. A method for setting the target density for the S dots of cyan will be described with reference to FIG. 8. First, the densities of the three detection target regions in total, which are contained in the test regions printed using the same nozzle group, are read from density values stored in the memory 230 and values of the input voltages in printing of the test regions containing the respective detection target regions are read. Based on the densities and the values of the input voltages, the three detection points (density values and input voltages) are specified. For example, the densities of the three detection target regions in total, which are contained in the test regions printed using the first nozzle group CL1, and the values of the input voltages are read. Based on the densities and the values of the input voltages, the three detection points p11 to p13 illustrated in FIG. 8 are specified. Similarly, the densities of the three detection target regions in total, which are contained in the test regions printed using the third nozzle group CL2, and the input signals are read. Based on the densities and the input voltages, the three detection points p21 to p23 illustrated in FIG. 8 are specified. It should be noted that three detection points are also specified for the other ink colors and dot sizes, which are not illustrated in FIG. 8. Then, among the detection points related to the detection target regions contained in the test regions formed with the S dots of cyan, the detection points related to the detection target regions contained in the test regions printed upon input of the reference voltage V0 as the input signals are specified. For example, in the example of FIG. 8, the detection point p12 and the detection point p22 are specified. An average density of the plurality of specified detection points is calculated and the average density is set to the target density. For example, in the example of FIG. 8, an average density of the density at the detection point p12 and the density at the detection point p22 is set as a target density Lt.

Next, calibration of the input signal for the S dots of cyan will be described with reference to FIG. 8. First, correspondence relations between the input signal and the density for the respective nozzle groups are derived using the three detection points related to the three detection target regions in total, which are contained in the test regions printed using the same nozzle groups. For example, the correspondence relation between the input signal and the density for the first nozzle group CL1, that is, a straight line R1 is derived using the three detection points p11 to p13 illustrated in FIG. 8. In the embodiment, the straight line R1 is derived by an interpolation method using the voltage values and the densities at the three detection points p11 to p13. Furthermore, for example, the correspondence relation between the input signal and the density for the third nozzle group CL2, that is, a straight line R2 is derived using the three detection points p21 to p23 illustrated in FIG. 8. Similar to the straight line R1, the straight line R2 is also derived by the interpolation method using the voltage values and the densities at the three detection points p21 to p23. It should be noted that the correspondence relations are also derived for the other nozzle groups and dot sides, which are not illustrated in FIG. 8, in the similar manner. Then, intersections of the target densities Lt and the derived correspondence relations between the input signal and the density, that is, the straight lines R1, R2, and the like, which have been derived for the respective nozzle groups, are obtained and the input voltages at the intersections are set to input voltages for forming the dots of the corresponding sizes for the corresponding nozzle groups. For example, a value Vm1 of the input signal at the intersection between the straight line R1 and the target density Lt, which are illustrated in FIG. 8, is set as the input signal for forming the S dots for the first nozzle group CL1. Similarly, a value Vm2 of the input signal at the intersection between the straight line R2 and the target density Lt, which are illustrated in FIG. 8, is set as the input signal for forming the S dots for the third nozzle group CL2. It should be noted that the input voltages are also set and calibrated for the other nozzle groups and the other dot sizes, which are not illustrated in FIG. 8.

As described above, the input signals for the respective dot sizes are input commonly to the two nozzle groups arranged in the same print chips. For example, the same input signal (input voltage) is supplied, as the signal for the same dot size, to two of the first nozzle group CL1 and the second nozzle group ML1 of the first print chip Ch1. Accordingly, the above-described pieces of processing at steps S120 to S130 can be omitted for either of the nozzle groups included in the same print chips. In the embodiment, steps S120 to S130 are omitted for the nozzle groups for discharging the magenta ink and the nozzle groups for discharging the yellow ink. For the nozzle groups for discharging the magenta ink, the input signals obtained by steps S120 to S130 executed for the nozzle groups for discharging the cyan ink, which are arranged on the same print chips, are used in printing. Similarly, for the nozzle groups for discharging the yellow ink, the input signals obtained by steps S120 to S130 executed for the nozzle groups for discharging the black ink, which are arranged on the same print chips, are used in printing.

The input signals calibrated as described above are overwritten and stored in the memory 230 and are referred in next and succeeding printing.

As described above, when the target densities are set for the respective dot sizes of the respective ink colors, the average values of the densities of the detection target regions at the same positions in the test regions printed by the different print chips are used. With this manner, generation of errors of the measured densities due to variations in environments in the image capturing is suppressed. This effect will be described with reference to FIG. 9 and FIG. 10.

FIG. 9 is a descriptive view for explaining variations in the densities for the respective ink colors when the densities at the same positions in different captured images or different color measurement regions are detected. FIG. 9 illustrates, for the respective ink colors, the variations in the densities (L*) in the case of color measurement using a colorimeter and the variations in the densities (L*) in the case of detection from the captured images captured by the image capturing unit 500. In the example of FIG. 9, for the respective ink colors, the color measurement using the colorimeter is performed at the same positions in the different color measurement regions and differences between maximum values and minimum values of the densities obtained by the color measurement are indicated as the variations (index values). Similarly, for the respective ink colors, the density detection is performed at the same positions in the different captured images a plurality of number of times as in the above-described input voltage calibration processing and differences between maximum values and minimum values of the detected densities are indicated as the variations (index values). It should be noted that FIG. 9 illustrates the variations (the index values of the density differences) on the longitudinal axis in a normalized manner. To be specific, the densities obtained using the colorimeter are indicated as the index values in the following manner. That is, after the densities are normalized by a spectral reflectance factor of the blank portions, the obtained values are converted into L*a*b values and are normalized into 0 to 100. Furthermore, the densities obtained from the captured images are indicated as the index values by multiplying respective gradation values of RGB by 0.8 as a coefficient of the blank portions and normalizing the obtained values into 0 to 100.

FIG. 10 is a descriptive view for explaining variations in the densities for the respective ink colors when the densities at different positions in the same captured images or the same color measurement regions are detected. In the example of FIG. 10, for the respective ink colors, the color measurement using the colorimeter is performed at the different positions in the same color measurement regions and differences between maximum values and minimum values of the densities obtained by the color measurement are indicated as the variations (index values). Similarly, for the respective ink colors, the density detection is performed at the different positions in the same captured images a plurality of number of times unlike the above-described input voltage calibration processing and differences between maximum values and minimum values of the detected densities are indicated as the variations (index values). A method for normalizing the respective values are the same as that in FIG. 9 and detailed description thereof is therefore omitted.

As is understood by comparing FIG. 9 to FIG. 10, the variations (the variations in the case of using the colorimeter and the variations in the case of using the image capturing unit 500) illustrated in FIG. 9 are smaller than the variations (the variations in the case of using the colorimeter and the variations in the case of using the image capturing unit 500) illustrated in FIG. 10 for all the ink colors. It is estimated that this result is obtained because environments in the image capturing largely vary due to in-plane variations in the regions as the density detection targets in the color measurement regions or the image capturing regions and the large variations in the environments significantly appear as the variations in the detected densities. Accordingly, in the case illustrated in FIG. 9, that is, the case in which the densities are detected at the same positions in the respective captured images as in the above-described input voltage calibration processing, the variations in the densities for the respective ink colors can be reduced and more appropriate densities can be set as the target densities. Therefore, lowering of the input voltage calibration accuracy can be suppressed.

Furthermore, as is understood from FIG. 10, in general, the variations in the detected densities can be suppressed in the case of using the colorimeter in comparison with the case of using the image capturing unit. However, as described above, the detection of the densities at the same positions in the respective captured images enables the variations in the detected densities in the case of using the image capturing unit 500 to be suppressed to the same extents to the variations in the detected densities in the case of using the colorimeter as illustrated in FIG. 9. Accordingly, even when the colorimeter is not mounted in the printing apparatus 100 instead of the image capturing unit 500 or in addition to the image capturing unit 500, lowering of the input voltage calibration accuracy can be suppressed and increase in manufacturing cost of the printing apparatus 100 can be suppressed.

As described above, for the nozzle groups for discharging the yellow ink, steps S120 to S130 are omitted and the input signals obtained by steps S120 to S130 executed for the nozzle groups for discharging the black ink, which are arranged on the same print chips, are used in printing. With this configuration, in addition to the effects that time required for the input voltage calibration processing can be shortened, processing load of the controller 200 can be reduced, and the ink amount which is used for printing the test image can be reduced, lowering of the input voltage calibration accuracy in the print chips Ch3 to Ch6 including the nozzle groups (the fifth nozzle group YL3, the seventh nozzle group YL4, the tenth nozzle group YL5, and the twelfth nozzle group YL6) for discharging the yellow ink can be suppressed. The effect of suppressing the lowering of the calibration accuracy will be described with reference to FIG. 11.

Figure 11:
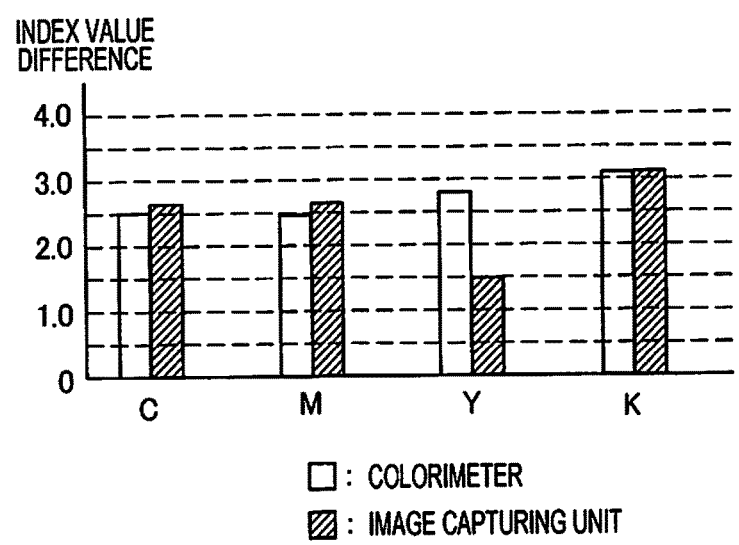
FIG. 11 is a descriptive view for explaining density detection ranges for the respective ink colors.

FIG. 11 is a descriptive view for explaining density detection ranges for the respective ink colors. In FIG. 11, for the respective detection target regions in the test regions with the input voltages of V− and in the test regions with the input voltages of V+, which are common in the ink colors and the dot sizes, the densities are measured by the colorimeter and the capturing of images are carried out and densities detection are carried out based on the captured images by the image capturing unit 500. Then, differences (density measurement ranges) in the measured or detected densities are normalized and indicated as index values. It should be noted that a method for normalizing the respective values are the same as that in FIG. 9 and FIG. 10 and detailed description thereof is therefore omitted.

As illustrated in FIG. 11, the density measurement range in the case of using the colorimeter does not largely differ among the ink colors. On the other hand, the variation in the density in the case of using the image capturing unit 500 is extremely smaller in the measurement range for yellow than those for the other three colors. To be specific, the measurement range for yellow is substantially the half of the measurement ranges of the other three colors. This result indicates that change in the density for the yellow ink is smaller than those for the other colors of inks even when the input voltage is changed. For an ink of a light color like yellow, change in the density cannot be sensitively detected as the characteristics of the image capturing unit 500. Therefore, the degree of the change in the density in response to the change in the input voltage is small for the yellow ink. Accordingly, if the detected densities involve even such a relatively small variation with the repeated measurement as illustrated in FIG. 9, the measurement variation gives a large influence on the measured densities for the yellow ink in comparison with the other colors of inks when the detected densities involve the measurement variation. As a result, the input voltage calibration accuracy based on the densities is lowered. On the other hand, the measurement range for the black ink is larger than the measurement range for the yellow ink. Therefore, even if the detected densities involve the measurement variation, an influence by the measurement variation is relatively small. As a result, lowering of the input voltage calibration accuracy based on the densities can be suppressed. Accordingly, the printing apparatus 100 in the embodiment can suppress lowering of the input voltage calibration accuracy because for the nozzle groups for discharging the yellow ink, steps S120 to S130 are omitted and the input signals obtained by steps S120 to S130 executed for the nozzle groups for discharging the black ink, which are arranged on the same print chips, are used. In other words, with the printing apparatus 100, the input voltages that are input to the nozzle groups for discharging the yellow ink are calibrated together with calibration of the input voltages for the black ink. Therefore, lowering of the calibration accuracy of the input voltages that are input to the nozzle groups of the yellow ink can be suppressed.

One of two test regions which are different only in the input voltage difference among the print chip that has discharged the ink, the dot size, the ink color (nozzle group), and the input voltage difference, like the above-described test region T11 and test region T12, corresponds to a first test region in "SUMMARY" and the other thereof corresponds to a second test region in "SUMMARY". In this case, the detection target region (for example, the detection target region Or1) in the one test region corresponds to a first detection target region in "SUMMARY" and the detection target region in the other test region corresponds to a second detection target region in "SUMMARY". Furthermore, one of two test regions which are different only in the print chip that has discharged the ink among the print chip that has discharged the ink, the dot size, the ink color (nozzle group), and the input voltage difference, like the above-described test region T11 and test region T31, corresponds to the first test region in "SUMMARY" and the other thereof corresponds to a third test region in "SUMMARY". For example, when the test region T11 is the first test region and the detection target region Or1 is the first detection target region, the detection target region Or3 in the test region T31 corresponds to a third detection target region in "SUMMARY". In this case, the test region T32 corresponds to a fourth test region in "SUMMARY" and the detection target region in the test region T32 corresponds to a fourth detection target region in "SUMMARY". Among the reference voltage V0, the voltage V−, and the voltage V+, the two types of voltage that are different with each other correspond to a first voltage and a second voltage in "SUMMARY". Similarly, among the reference voltage V0, the voltage V−, and the voltage V+, the two types of voltage that are different with each other correspond to a third voltage and a fourth voltage in "SUMMARY". One of the input voltage for forming the S dots and the input voltage for forming the L dots corresponds to an input voltage in "SUMMARY" and the other thereof corresponds to a second input voltage in "SUMMARY".

With the printing apparatus 100 as described above, the positions of the detection target regions in the captured images obtained by image capturing at the respective positions are made identical to one another. Therefore, differences in the environments in the image capturing when the captured images containing the respective detection target regions are obtained can be reduced, thereby suppressing lowering of the input voltage calibration accuracy.

The respective detection target regions have the same shape and size. Therefore, the densities of the respective detection target regions can be detected under the similar conditions, thereby suppressing lowering of the input voltage calibration accuracy.

The respective detection target regions do not contain the outer edges of the test regions containing themselves. Therefore, an influence by light entering the respective detection target regions from outer portions relative to the outer edges of the test regions can be suppressed. Accordingly, the densities of the detection target regions can be measured with high accuracy.

The image capturing unit 500 captures the images such that the positions of the respective test regions in the captured images are identical to one another. Therefore, the positions of the detection target regions in the respective test regions can be made identical to one another. Accordingly, the detection conditions of the densities of the respective detection target regions can be further made identical to one another, thereby suppressing lowering of the input voltage calibration accuracy.

Different voltages, to be specific, the voltages for forming the L dots and the voltages for forming the S dots are input to the respective nozzle groups to print the test regions with the S dots and the test regions with the L dots for calibration of the input voltages for the respective dots. Therefore, one-time printing of the test image enables the voltages for forming the L dots and the voltages for forming the S dots to be calibrated with high accuracy. In addition, the region containing the two test regions aligned in the sub scanning direction Y is image-captured by one time. Time required to calibrate the input voltages and the processing load can be reduced in comparison with the configuration in which each of the regions containing the test regions is image-captured.

The voltages that are input to the nozzle groups for discharging the yellow ink are calibrated together with the calibration of the voltages that are input to the nozzle groups for discharging the black ink. Therefore, lowering of the calibration accuracy of the voltages that are input to the nozzle groups for discharging the yellow ink can be suppressed in comparison with the configuration in which the voltages that are input to the nozzle groups for discharging the yellow ink are calibrated in a separate manner from the input voltages that are input to the nozzle groups for discharging the black ink. As a reason of this, in general, the degree of the change in the density in response to the change in the input voltage is larger for the black ink than the yellow ink and an influence of density measurement errors can therefore be further suppressed.

Moreover, the correspondence relations between the input signal and the density for the respective nozzle groups are derived using the three detection points (densities and input voltages) related to the three detection target regions in total, which are contained in the test regions printed using the same nozzle groups. Then, the values of the input voltages corresponding to the target densities in the correspondence relations are set as the input voltages that are used for printing. Therefore, the input voltages can be set so as to be the target densities with high accuracy.

B. Variations

B1. Variation 1

Although the respective detection target regions have the same shape and the same size in the above-described embodiment, at least some of the detection target regions may be different from the other detection target regions in at least one of the shape and the size. Even in this case, the environments when the respective captured images are obtained can be made to be similar by making the positions of the respective detection target regions in the captured images, that is, the positions (relative positions) of the gravity centers of the respective detection target regions in the captured images identical to one another. Accordingly, lowering of the input voltage calibration can be suppressed with high accuracy.

B2. Variation 2

Although the respective detection target regions are located at substantially the centers of the test regions in the above-described embodiment, the invention is not limited thereto. The detection target regions may be located at desired positions such as corners of the test regions as long as the positions of the test regions in the respective captured images are the same. For example, the respective detection target regions may be set so as to contain the outer edges of the test regions. Even in this case, the positions of the respective detection target regions in the respective captured images are identical to one another, thereby providing the same effects as those in the above-described embodiment. Furthermore, although the respective detection target regions are parts of the test regions in the above-described embodiment, they may be the test regions overall.

B3. Variation 3

Although the test image is formed by the aggregate of the plurality of test regions which are different from one another in at least one element of the print chip that has discharged the ink, the dot size, the ink color (nozzle group), and the input voltage difference, the invention is not limited thereto. For example, when the printing apparatus 100 has the configuration of forming dots of only one size, the test image may be formed by an aggregate of test regions formed by dots of one type. Furthermore, the shapes and the sizes of the respective test regions can be desirably set. Although the respective test regions have the same shape and the same size, at least some of the test regions may be different from the other test regions in at least one of the shape and the size. Moreover, at least some of the test regions may be located at different positions to one another in the captured images. Even in this case, the same effects as those in the above-described embodiment can be provided by making the positions of the respective detection target regions in the respective captured images identical to one another. It should be noted that in this configuration, the positions of the detection target regions in the respective test regions are different from one another in some cases.

B4. Variation 4

Although for the nozzle groups for discharging the yellow ink, steps S120 to S130 are omitted and the input signals obtained by steps S120 to S130 executed for the nozzle groups for discharging the black ink, which are arranged on the same print chips, are used in printing in the above-described embodiment, the invention is not limited thereto. The configuration inverse to the above-described configuration may be employed. That is to say, for the nozzle groups for discharging the black ink, S120 to S130 are omitted and input signals obtained by steps S120 to S130 executed for the nozzle groups for discharging the yellow ink, which are arranged on the same print chips, are used in printing. Furthermore, unlike the above-described embodiment, in the configuration in which the input signals for the respective dot sizes are set for the respective nozzle groups, S120 to S130 may be executed for the respective nozzle groups for calibration of the input voltages.

B5. Variation 5

Although the average values of the densities of the test regions (detection target regions) which are different in the print chip and are common in the ink color, the input voltage (reference voltage V0), and the dot size are obtained and the average densities are set as the target densities at step S125 in the above-described embodiment, the invention is not limited thereto. The target densities may be previously determined. In this case, as in the above-described embodiment, the correspondence relations (straight lines) between the input signal and the density for the respective nozzle groups may be derived and input voltages at intersections where the correspondence relations and the previously determined target densities intersect may be set as the input voltages that are used for printing.

B6. Variation 6

Although the printing apparatus 100 performs printing using the inks of four colors (cyan, magenta, yellow, and black) in the above-described embodiment, the invention is not limited thereto. For example, the printing apparatus 100 may perform printing using inks of light-cyan (Lc) and light-magenta (Lm). In this case, in the configuration in which nozzle groups for discharging the light-cyan or light-magenta ink and the nozzle groups for discharging any of the inks of cyan, magenta, and black are arranged in the same print chips, the following method may be employed similarly to the case for the nozzle groups for discharging the yellow ink in the above-described embodiment. That is, for the nozzle groups for discharging the light-cyan or light-magenta ink, S120 to S130 are omitted and S120 to S130 may be executed for the other nozzle groups on the same print chips for calibration of the input voltages. In general, the configuration in which the input voltages that are input to the nozzle groups for discharging the light ink are calibrated together with calibration of the input voltages that are input to the nozzle groups for discharging the dark ink can suppress lowering of the calibration accuracy of the input voltages that are input to the print chips including the two types of the nozzle groups. As exemplified by the above-described yellow ink, when the densities of the light ink are measured using the image capturing unit 500, the change in the density in response to the change in the input voltage is relatively small. Accordingly, the above-described configuration can suppress lowering of the calibration accuracy of the input voltages that are supplied to the nozzle groups for discharging the light ink.

B7. Variation 7

Although each of the print chips includes the two nozzle groups in the above-described embodiment, the number of nozzle groups is not limited to two. Each of the print chips may include the desired number of nozzle groups. Furthermore, although the printing apparatus 100 is the ink jet printer, the printing apparatus 100 may be a printer of a desired system, which discharges inks in accordance with the input voltages.

B8. Variation 8

In the above-described embodiment, some of the configurations that are implemented by hardware may be replaced by software and some of the configurations that are implemented by software may be replaced by hardware. When some or all of the functions in the invention are implemented by software, the software (computer program) can be provided while being stored in a computer-readable recording medium. The "computer-readable recording medium" is not limited to a portable recording medium such as a flexible disk and a CD-ROM (compact disc read only memory), and includes various internal storage devices in a computer, such as a RAM (random access memory) and a ROM (read only memory), and external storage devices fixed to the computer, such as a hard disk. That is to say, the "computer-readable recording medium" is used in a broad sense including a desired recording medium that can store data not temporarily but fixedly.

B9. Variation 9

Although after the processing at step S110 of returning the medium P on which the test image TI has been printed to the upstream side from the downstream side, the test image TI printed on the medium P is captured in the configuration of the above-described embodiment, the configuration is not limited thereto. Alternatively, a desired configuration enabling image capturing may be employed. For example, the image capturing unit 500 may be moved to an image capturing start position without performing the operation of returning the medium P on which the test image TI has been printed to the upstream side from the downstream side.

The invention is not limited to the above-described embodiment and variations and can be implemented with various configurations in a range without departing from the gist thereof. For example, technical features in the embodiment and variations, which correspond to technical features in the respective aspects described in "SUMMARY", can be appropriately replaced and combined in order to solve a part or all of the above-described issues or achieve a part or all of the above-described effects. The technical features can be appropriately deleted unless they are described as essential elements in the specification.

This application claims priority under 35 U.S.C. § 119 to Japanese Patent Application No. 2017-018633, filed Feb. 3, 2017. The entire disclosure of Japanese Patent Application No. 2017-018633 is hereby incorporated herein by reference.

What is claimed is:

1. A printing apparatus that performs printing on a medium, comprising:
   a print chip that has a first nozzle group through which ink is discharged in accordance with a commonly used input voltage;
   a print controller that controls the print chip to print, on the medium, a test image containing a first test region which is printed upon input of a first voltage as the input voltage and a second test region which is printed upon input of a second voltage as the input voltage, the second voltage being different from the first voltage;
   an image capturing unit that image-captures each of a plurality of regions having a region containing the first test region and a region containing the second test region, which are formed by dividing the test image printed on the medium;
   a density detector that detects a density of a first detection target region as at least a part of the first test region in a captured image provided by image capturing by the image capturing unit and a density of a second detection target region as at least a part of the second test region in the captured image; and
   a voltage calibrator that calibrates the input voltage based on the density of the first detection target region, the density of the second detection target region, a value of the first voltage, and a value of the second voltage,
   wherein a position of the first detection target region in the captured image and a position of the second detection target region in the captured image are identical to each other.

2. The printing apparatus according to claim 1, wherein the first detection target region and the second detection target region have the same shape and size.

3. The printing apparatus according to claim 1, wherein the first detection target region does not contain outer edges of the first test region, and the second detection target region does not contain outer edges of the second test region.

4. The printing apparatus according to claim 1, wherein the image capturing unit image-captures each of the regions such that a position of the first test region in the captured image and a position of the second test region in the captured image are identical to each other.

5. The printing apparatus according to claim 1, wherein the print chip further has a second nozzle group which is different from the first nozzle group, and through which ink of the same color as a color of the ink that is discharged through the first nozzle group is discharged in accordance with a common second input voltage being different from the input voltage,
   the print controller controls the print chip to print, as the test image, an image containing, in addition to the first test region and the second test region, a third test region which is printed upon input of a third voltage as the second input voltage and a fourth test region which is printed upon input of a fourth voltage as the second input voltage, the fourth voltage being different from the third voltage,
   the image capturing unit image-captures a region containing the first test region and the third test region by one time and a region containing the second test region and the fourth test region by one time,
   the density detector detects a density of a third detection target region as at least a part of the third test region in the captured image and a density of a fourth detection target region as at least a part of the fourth test region in the captured image,
   the voltage calibrator calibrates the second input voltage based on the density of the third detection target region, the density of the fourth detection target region, a value of the third voltage, and a value of the fourth voltage; and
   a position of the third detection target region in the captured image and a position of the fourth detection target region in the captured image are matched each other.

6. The printing apparatus according to claim 1, wherein the print chip has a third nozzle group which is different from the first nozzle group, through which ink of a different color from a color of the ink that is discharged through the first nozzle group is discharged, and to which the same voltage as the input voltage is commonly input when executing printing with the same print density as the first nozzle group;
   a dark ink is discharged through the first nozzle group;
   a light ink is discharged through the third nozzle group; and
   the voltage calibrator calibrates the input voltage to calibrate the voltage which is input to the third nozzle group and is the same voltage as the input voltage together.

7. The printing apparatus according to claim 1, wherein the voltage calibrator derives a correspondence relation between the input voltage and a density based on the density of the first detection target region, the density of the second detection target region, the value of the first voltage, and the value of the second voltage, and sets a value of the input voltage, which corresponds to a previously set target density in the correspondence relation, as the input voltage.

8. A method for calibrating an input voltage in a printing apparatus including a print chip that has a first nozzle group through which ink is discharged in accordance with the common input voltage, the method comprising:
   controlling the print chip to print, on a medium, a test image containing a first test region which is printed upon input of a first voltage as the input voltage and a second test region which is printed upon input of a second voltage as the input voltage, the second voltage being different from the first voltage;

image-capturing each of a plurality of regions having a region containing the first test region and a region containing the second test region, which are formed by dividing the test image printed on the medium;

detecting a density of a first detection target region as at least a part of the first test region in a captured image provided at the image capturing and a density of a second detection target region as at least a part of the second test region in the captured image; and calibrating the input voltage based on the density of the first detection target region, the density of the second detection target region, a value of the first voltage, and a value of the second voltage, wherein a position of the first detection target region in the captured image and a position of the second detection target region in the captured image are matched each other.

* * * * *